(12) United States Patent
Zeng et al.

(10) Patent No.: US 10,592,784 B2
(45) Date of Patent: Mar. 17, 2020

(54) DETECTION BASED ON FUSION OF MULTIPLE SENSORS

(71) Applicant: GM GLOBAL TECHNOLOGY OPERATIONS LLC, Detroit, MI (US)

(72) Inventors: Shuqing Zeng, Sterling Heights, MI (US); Wei Tong, Troy, MI (US); Yasen Hu, Warren, MI (US); Mohannad Murad, Troy, MI (US); David R. Petrucci, Warren, MI (US); Gregg R. Kittinger, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 137 days.

(21) Appl. No.: 15/900,206

(22) Filed: Feb. 20, 2018

(65) Prior Publication Data

US 2019/0258894 A1 Aug. 22, 2019

(51) Int. Cl.
*G06K 9/62* (2006.01)
*G08G 1/16* (2006.01)
*G06K 9/00* (2006.01)

(52) U.S. Cl.
CPC ......... *G06K 9/629* (2013.01); *G06K 9/00798* (2013.01); *G06K 9/6289* (2013.01); *G08G 1/167* (2013.01)

(58) Field of Classification Search
CPC .. G06K 9/629; G06K 9/6289; G06K 9/00798; G08G 1/167
See application file for complete search history.

(56) References Cited

U.S. PATENT DOCUMENTS

| | | | |
|---|---|---|---|
| 6,219,640 B1* | 4/2001 | Basu | G06K 9/00221 704/231 |
| 8,976,040 B2* | 3/2015 | Ray Avalani | B60Q 9/008 340/435 |
| 9,809,159 B1* | 11/2017 | Snyder | B60T 17/22 |
| 10,255,528 B1* | 4/2019 | Nguyen | G06K 9/6289 |
| 2005/0236210 A1* | 10/2005 | Kawazoe | B60Q 9/008 180/272 |
| 2008/0243337 A1* | 10/2008 | Tsuda | B60T 8/17557 701/41 |
| 2008/0306705 A1* | 12/2008 | Luo | B61K 9/04 702/134 |
| 2014/0274025 A1* | 9/2014 | Paul | H04M 1/6075 455/419 |
| 2018/0251122 A1* | 9/2018 | Golston | B60W 30/025 |

(Continued)

OTHER PUBLICATIONS

Ben-Hur, Asa, and Jason Weston. "A user's guide to support vector machines." In Data mining techniques for the life sciences, pp. 223-239. Humana Press, 2010. (Year: 2010).*

(Continued)

*Primary Examiner* — Carol Wang
(74) *Attorney, Agent, or Firm* — Cantor Colburn LLP

(57) ABSTRACT

A system and method to perform detection based on sensor fusion includes obtaining data from two or more sensors of different types. The method also includes extracting features from the data from the two or more sensors and processing the features to obtain a vector associated with each of the two or more sensors. The method further includes concatenating the two or more vectors obtained from the two or more sensors to obtain a fused vector, and performing the detection based on the fused vector.

13 Claims, 4 Drawing Sheets

(56) References Cited

U.S. PATENT DOCUMENTS

2018/0284780 A1* 10/2018 McWhirter ........... G01S 17/023
2018/0348764 A1* 12/2018 Zhang .................. G05D 1/0088
2018/0372499 A1* 12/2018 Ali ....................... G01C 21/165
2019/0114489 A1*  4/2019 Jackson ............. G06K 9/00805

OTHER PUBLICATIONS

Fu, Yun, Liangliang Cao, Guodong Guo, and Thomas S. Huang. "Multiple feature fusion by subspace learning." In Proceedings of the 2008 international conference on Content-based image and video retrieval, pp. 127-134. ACM, 2008. (Year: 2008).*

Tucker, Mark, Adam Heenan, and Alastair Buchanan. "Real time embedded sensor fusion for driver assistance." In Proceedings. 2005 IEEE Intelligent Transportation Systems, 2005., pp. 596-601. IEEE, 2005. (Year: 2005).*

* cited by examiner

DETECTION BASED ON FUSION OF MULTIPLE SENSORS

INTRODUCTION

The subject disclosure relates to detection based on the fusion of multiple sensors.

Vehicles (e.g., automobiles, trucks, farm equipment, construction equipment, automated factory equipment) are increasingly instrumented with sensors facilitate augmented or automated operation. Exemplary sensors include those that capture data about the environment around the vehicle and those that capture data about the vehicle. For example, cameras, audio detectors (e.g., microphones), and radar or lidar systems obtain data about the environment around the vehicle (e.g., other objects in the vicinity of the vehicle). As another example, accelerometers, speedometers, and the like obtain data about the vehicle and its operation. In prior systems, fusion of information from different sensors for purposes of detection involved fusion of the detection results. That is, each individual sensor determined a confidence level associated with detection, and the results from two or more sensors were combined to make a detection determination. However, this detection architecture cannot fully take advantage of information from each sensor. Accordingly, it is desirable to provide detection based on fusion of multiple sensors.

SUMMARY

In one exemplary embodiment, a method to perform detection based on sensor fusion includes obtaining data from two or more sensors of different types. The method also includes extracting features from the data from the two or more sensors and processing the features to obtain a vector associated with each of the two or more sensors. The method further includes concatenating the two or more vectors obtained from the two or more sensors to obtain a fused vector, and performing the detection based on the fused vector.

In addition to one or more of the features described herein, the method also includes normalizing each of the two or more vectors associated with the two or more sensors prior to the concatenating.

In addition to one or more of the features described herein, the method also includes normalizing the fused vector prior to the performing the detection.

In addition to one or more of the features described herein, the performing the detection includes implementing a machine learning algorithm.

In addition to one or more of the features described herein, the performing the detection includes implementing a rule-based algorithm.

In addition to one or more of the features described herein, the obtaining the data from the two or more sensors includes obtaining the data from a microphone and a camera.

In addition to one or more of the features described herein, the obtaining the data from the two or more sensors includes obtaining the data in a vehicle.

In addition to one or more of the features described herein, the performing the detection includes detecting a rumble strip using the fused vector based on the two or more sensors being in the vehicle.

In another exemplary embodiment, a system to perform detection based on sensor fusion includes two or more sensors of different types to obtain data. The system also includes a processor to extract features from the data from the two or more sensors, process the features to obtain a vector associated with each of the two or more sensors, concatenate the two or more vectors obtained from the two or more sensors to obtain a fused vector, and perform the detection based on the fused vector.

In addition to one or more of the features described herein, the processor normalizes each of the two or more vectors associated with the two or more sensors prior to concatenating.

In addition to one or more of the features described herein, the processor normalizes the fused vector prior to performing the detection.

In addition to one or more of the features described herein, the processor is configured to perform the detection by implementing a machine learning algorithm.

In addition to one or more of the features described herein, the processor implements a rule-based algorithm.

In addition to one or more of the features described herein, the two or more sensors includes a microphone and a camera.

In addition to one or more of the features described herein, the two or more sensors are in a vehicle.

In addition to one or more of the features described herein, the processor detects a rumble strip.

In another exemplary embodiment, a lane departure system in a vehicle includes a camera to obtain images, and a microphone to obtain audio data. The system also includes a controller to extract visual features from the images, extract audio features from the audio data, combine the visual features and the audio features into combined features, perform detection based on the combined features, and indicate lane departure based on the detection.

In addition to one or more of the features described herein, the system also includes an inertial measurement unit (IMU) configured to obtain vibration data. The combined features include features extracted from the vibration data.

In addition to one or more of the features described herein, the detection detects a rumble strip indicating a shoulder area of a roadway.

In addition to one or more of the features described herein, the controller performs augmented or automated vehicle action based on the detection.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
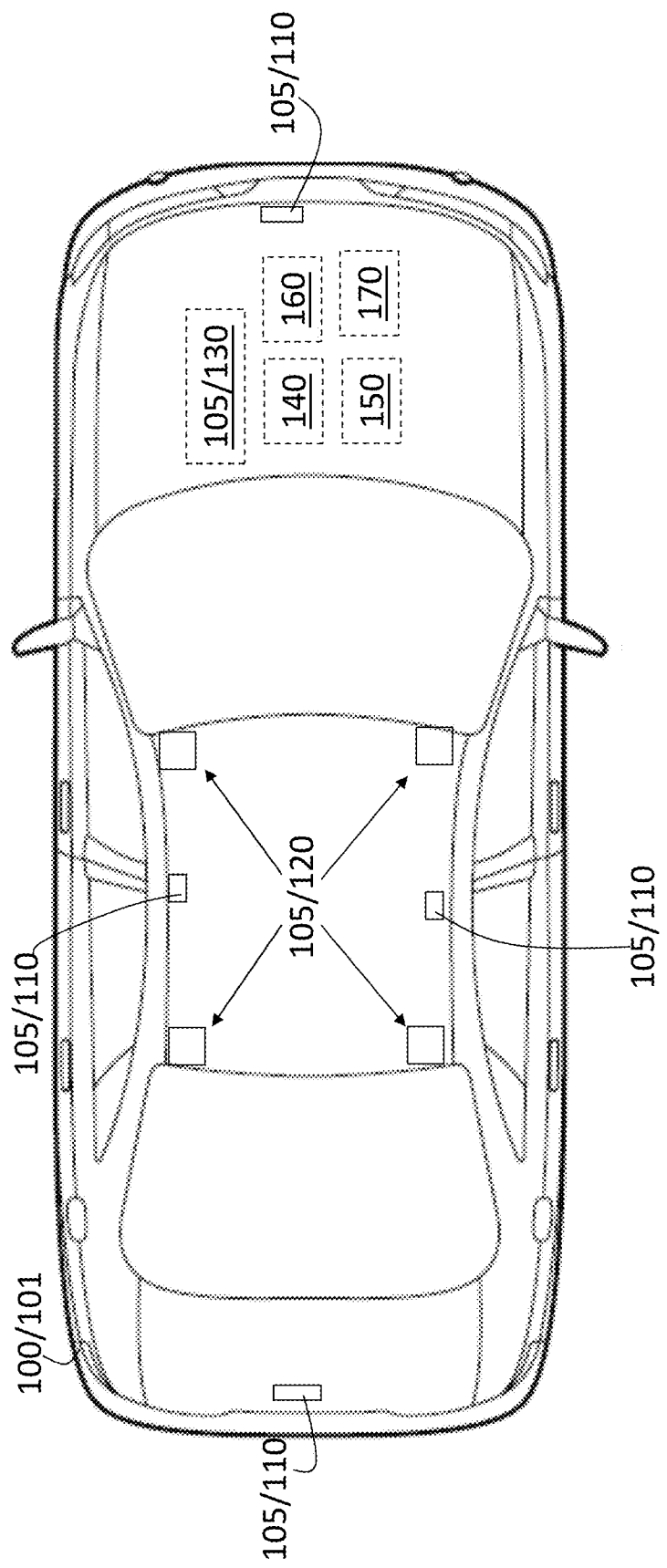
FIG. 1 is a block diagram of a system to perform detection based on the fusion of multiple sensors according to one or more embodiments.

The following description is merely exemplary in nature and is not intended to limit the present disclosure, its application or uses. It should be understood that throughout the drawings, corresponding reference numerals indicate like or corresponding parts and features.

As previously noted, vehicles include multiple sensors and sensor fusion generally combines information from multiple sensors. Currently, detection based on sensor fusion refers to combining detection results from multiple sensors. That is, detection results and corresponding probabilities or confidence levels are provided by various sensors. The overall detection result may then be obtained through a rule-based combination or averaging of the detection results.

Embodiments of the systems and methods fuse the information from the various sensor prior to performing detection. Specifically, data from each sensor is concatenated prior to implementing a detection algorithm. The detection algorithm may be implemented as a machine learning algorithm, for example. The learning considers data from each sensor such that the system performs detection based on information from every sensor rather than being provided with detection results from every sensor as in prior systems.

A specific detection scenario is discussed herein. Three types of sensors, a camera, a microphone, and an inertial measurement unit (IMU) are used to detect a rumble strip and identify its location. This detection may be part of a fully or partially autonomous vehicle operation. Rumble strips may be located on the shoulder to indicate that a vehicle is leaving the roadway. Rumble strips may also be located long a line that separates lanes travelling in different directions. Transverse rumble strips may be located in areas (e.g., highway off ramps, prior to stop signs or traffic lights) to indicate that a vehicle should slow down or stop. While the rumble strip detection scenario is discussed for explanatory purposes, the fusion-prior-to-detection architecture detailed herein is applicable to other fusion detection or identification scenarios and is not intended to limit the applicability of the architecture.

In accordance with an exemplary embodiment, FIG. 1 is a block diagram of a system to perform detection based on the fusion of multiple sensors 105. The exemplary vehicle 100 in FIG. 1 is an automobile 101. Three exemplary sensors 105 are indicated. One type of sensor 105 is a camera 110. Four cameras 110 are shown at different locations around the vehicle 100. Another type of sensor 105 is a microphone 120. Four microphones 120 are shown in FIG. 1. The third type of sensor 105 shown in FIG. 1 is an IMU 130. The IMU 130 may include gyroscopes and accelerometers and measure vibration of the vehicle 100. Each of these types of sensors 105 is known and not further detailed herein.

A controller 140 performs the detection based on information from the different sensors 105. The controller 140 may implement a machine learning algorithm, as further discussed. The controller 140 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 140 may be in communication with an electronic control unit (ECU) 150 of the vehicle 100 that controls various vehicle systems 170 (e.g., collision avoidance, adaptive cruise control, autonomous driving). In alternate embodiments, the controller 140 may be part of the ECU 150. In addition to the ECU 150 and sensor 105, the controller 140 may be in communication with other systems 160 such as a global positioning sensor (GPS) system or mapping system. The other systems 160 may also include the infotainment system that obtains inputs from a driver and provides output to the driver.

Figure 2:
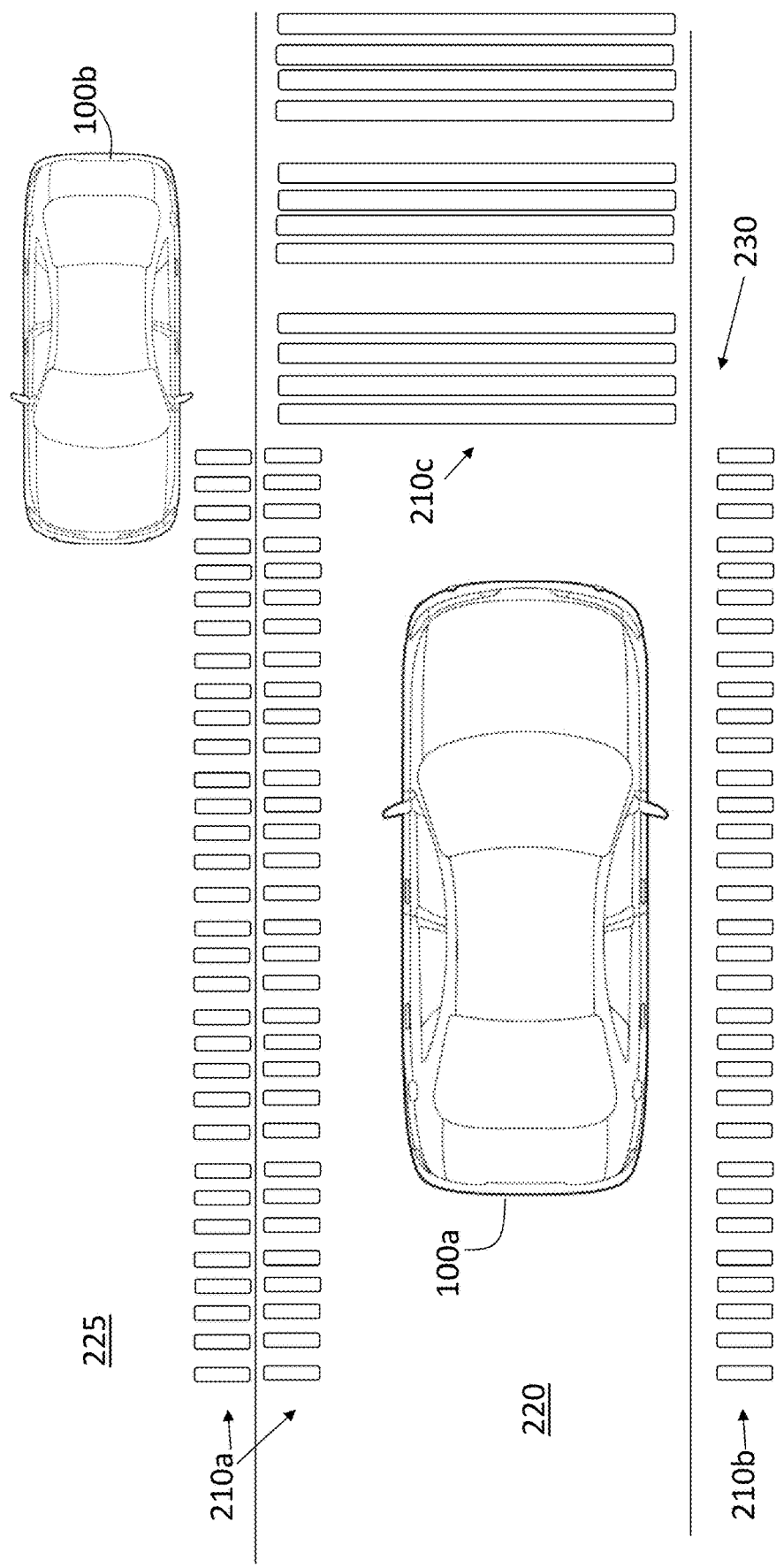
FIG. 2 illustrates several rumble strips that may be detected according to one or more embodiments.

FIG. 2 illustrates several rumble strips 210 that may be detected according to one or more embodiments. Rumble strips 210 may be raised bars or grooves in the roadway. FIG. 2 shows a vehicle 100a travelling in a lane 220 of a roadway and another vehicle 100b travelling in another lane 225 in the opposite direction as vehicle 100a. Two sets of rumble strips 210a may be used to delineate the lanes 220 and 225 with traffic travelling in opposite directions. A set of rumble strips 210b delineates the lane 220 of the roadway from the shoulder 230. Transverse rumble strips 210c are shown ahead of the vehicle 100a. These rumble strips 210c are generally arranged in periodic sets and may indicate an upcoming stop or area of slower speed, for example. According to the periodic arrangement shown in FIG. 2, the vehicle 100a encounters three sets of four rumble strips 210c. One or both of the vehicles 100a, 100b may include the sensors 105 and controller 140 discussed with reference to FIG. 1 to perform detection based on the fusion of multiple sensors 105.

Figure 3:
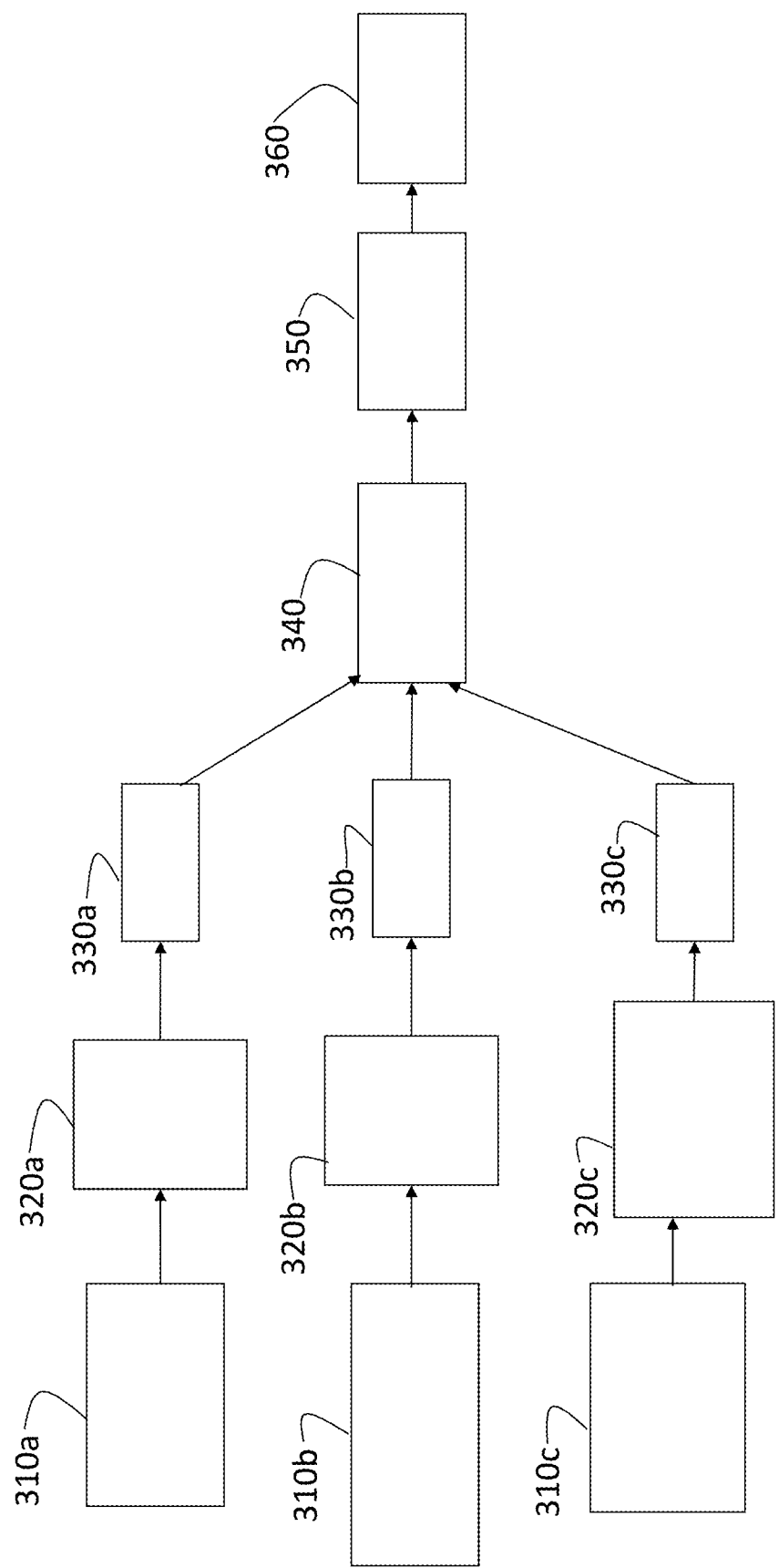
FIG. 3 shows a process flow of a method to perform detection based on the fusion of multiple sensors according to one or more exemplary embodiments.

FIG. 3 shows a process flow of a method to perform detection based on the fusion of multiple sensors 105 according to one or more exemplary embodiments. The exemplary embodiments relate to detecting rumble strips 210 based on the fusion of sensors 105 that include cameras 110, microphones 120, and an IMU 130. As previously noted, while the exemplary embodiments are detailed for explanatory purposes, the fusion architecture discussed with reference to FIG. 3 is applicable to the fusion of additional or alternate sensors 105 and to the detection of alternate or additional features to rumble strips 210.

At blocks 310a, 310b, 310c, the processes respectively include obtaining camera data from the cameras 110, obtaining microphone data from the microphones 120, and obtaining IMU data from the IMU 130. At blocks 320a, 320b, 320c, the processes include feature extraction.

At block 320a, extracting visual features from the data obtained from the cameras 110 is a known process and may include a series of processes to refine extracted features. The series of processes may include performing low-level feature extraction, performing mid-level feature extraction on the low-level features, and then performing high-level feature extraction on the mid-level features. For example, a multilayer convolutional neural network may be used to extract features from the images captured by the camera 110. At block 320b, extracting audio features from the data obtained from the microphones 120 is also known and refers to obtaining a vector of microphone levels, for example. At block 320c, extracting acceleration features from the data obtained from the IMU 130 also refers to obtaining a vector of values according to a known process.

At blocks 330a, 330b, 330c, the processes include normalizing the features that are respectively extracted at blocks 320a, 320b, and 320c. Normalization may refer to a number of different operations such as re-scaling, re-sizing vector lengths, and other established techniques. For example, normalizing the extracted features, at each of the blocks 330a, 330b, 330c, may result in a vector of values from −1 to 1. Thus, the image features from feature extraction at block 320a is normalized to a vector of values from −1 to 1, and the feature vectors obtained at blocks 320b and 320c are also normalized to values from −1 to 1. These processes are unique to the architecture detailed herein. In prior fusion systems, extracted features from data obtained with each of the sensors 105 is used to perform detection individually. According to embodiments of the architecture, the vectors obtained at blocks 330a, 330b, 330c are combined prior to performing detection, as detailed.

Concatenating, at block 340, refers to concatenating the vectors obtained by the normalizing at blocks 330a, 330b, and 330c. The result of concatenating is a vector with values between −1 and 1 that is the combined length of each of the vectors obtained at blocks 330a, 330b, and 330c. Normalizing, at block 350, refers to a normalization of the concatenated vector obtained at block 340. As previously noted, normalization may refer to re-scaling, re-sizing, or otherwise manipulating the concatenated vectors (e.g., parametric normalization, quantile normalization). The normalization at block 350 may be a different type of normalization than the normalization at blocks 330a, 330b, 330c. Performing detection, at block 360, refers to determining whether the concatenated data indicates the presence of rumble strips 210 and determining a confidence level of the detection. The detection may include implementing a machine learning algorithm and training the algorithm based on the data from all three types of sensors 105. As previously noted, a different set of sensors 105 may be fused to detect a different feature according to alternate embodiments.

Figure 4:
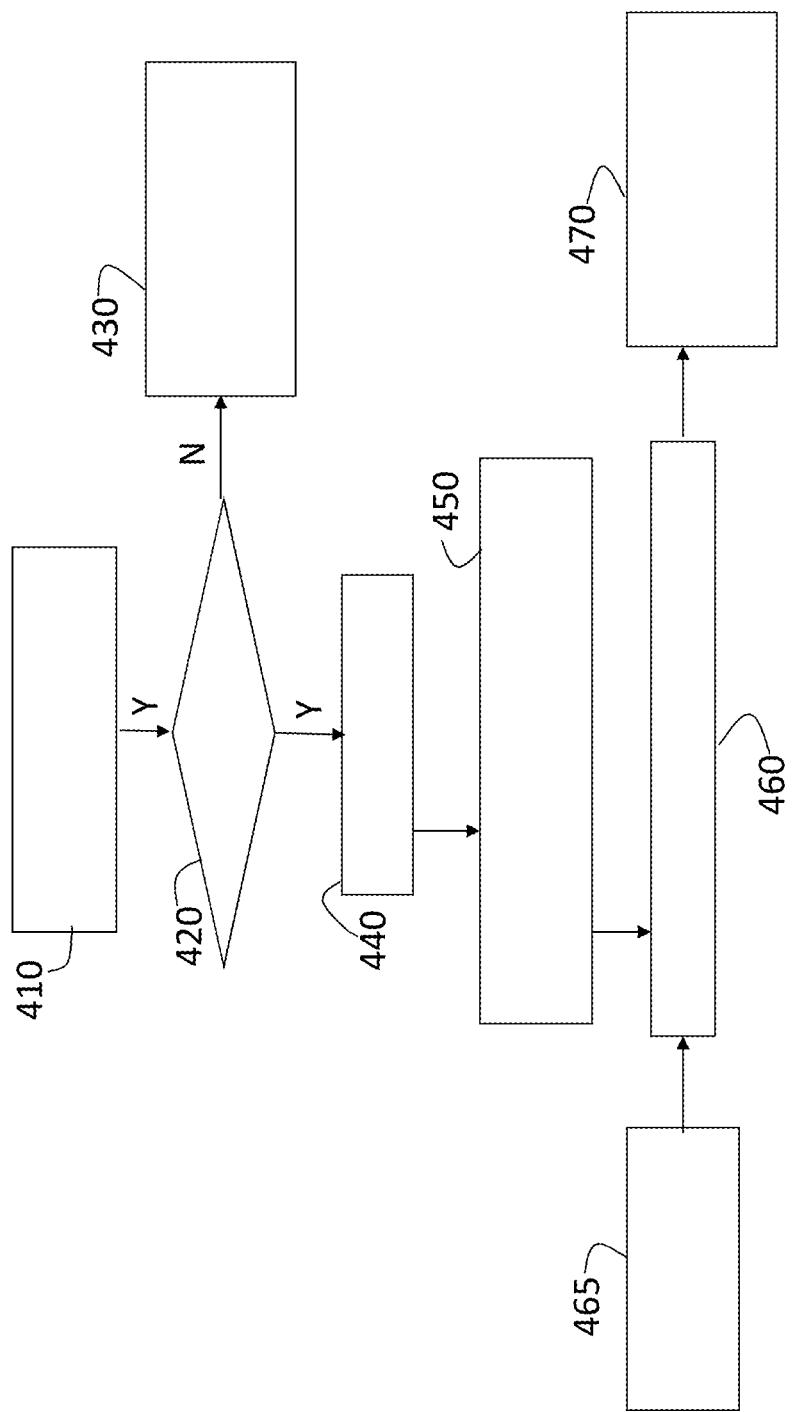
FIG. 4 is a process flow of an exemplary method of performing rumble strip detection based on the fusion of multiple sensors according to one or more embodiments.

FIG. 4 is a process flow of an exemplary method of performing rumble strip 210 detection based on the fusion of multiple sensors 105 according to one or more embodiments. At block 410, detecting the rumble strip 210 refers to the controller 140 obtaining the result of the processing at block 360, as discussed previously. A determination is then made, at block 420, of whether the rumble strip 210 relates to a lane divider (i.e., rumble strips 210a or 210b), as opposed to transverse rumble strips 210c.

This determination may be made according to different embodiments. For example, the periodicity of rumble strips 210c may be used to distinguish them from lane departure-alerting rumble strips 210a, 210b. This is because, as noted previously and illustrated in FIG. 2, the transverse rumble strips 210c are not continuous like rumble strips 210a, 210b but, instead, are periodic. As another example, the length of the rumble strips 210c may be used to make the determination at block 420. The transverse rumble strips 210c cause the rumble sound to be picked up by microphones 120 on both sides of the vehicle 100 and are visible on cameras 110 on both sides of the vehicle 100.

If the rumble strip 210 is determined, at block 420, not to relate to a lane divider, then it is assumed to be a transverse rumble strip 210c. In this case, at block 430, performing correction or providing a message refers to the controller 140, directly or through the ECU 150, instructing vehicle systems 170 to slow or stop the vehicle 100 or providing an alert to the driver through one of the other systems 160 (e.g., infotainment screen), for example. If the rumble strip 210 is determined, at block 420, to relate to a lane divider, then a set of processes is implemented to take corrective action.

At block 440, detecting each rumble strip 210a, 210b refers to using the relevant cameras 110. At block 450, estimating the heading and distance to the rumble strip 210 edge refers to determining the heading and distance to the closer edge of the rumble strips 210. Based on the estimate at block 450, estimating the steering correction angle, at block 460, refers to the angle to put the vehicle 100 back in the correct lane (e.g., 220). Estimating the steering correction angle, at block 460, includes determining the road curvature, at block 465. The determination of road curvature, at block 465, may include using one of the other systems 160 like the mapping system, for example. The steering correction angle estimated at block 460 may be used, at block 470, to perform automated action or to provide information to the driver. At block 470, performing correction refers to the controller 140 controlling vehicle systems 170 directly or through the ECU 150. At block 470, providing a message refers to the controller 140 alerting the driver to the required correction.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method to perform detection based on sensor fusion, the method comprising:
    obtaining data from two or more sensors of different types, the two or more sensors including a camera and a microphone;
    extracting features from the data from the two or more sensors and processing the features to obtain a vector associated with each of the two or more sensors;
    concatenating, using a processor, the two or more vectors obtained from the two or more sensors to obtain a fused vector; and
    performing the detection, using the processor, based on the fused vector, wherein the obtaining the data from the two or more sensors includes obtaining the data in a vehicle, and the performing the detection includes detecting a rumble strip using the fused vector based on the two or more sensors being in the vehicle.

2. The method according to claim 1, further comprising normalizing each of the two or more vectors associated with the two or more sensors prior to the concatenating.

3. The method according to claim 1, further comprising normalizing the fused vector prior to the performing the detection.

4. The method according to claim 1, wherein the performing the detection includes implementing a machine learning algorithm.

5. The method according to claim 1, wherein the performing the detection includes implementing a rule-based algorithm.

6. A system to perform detection based on sensor fusion, the system comprising:
    two or more sensors of different types configured to obtain data, wherein the two or more sensors includes a microphone and a camera; and
    a processor configured to extract features from the data from the two or more sensors, process the features to obtain a vector associated with each of the two or more sensors, concatenate the two or more vectors obtained from the two or more sensors to obtain a fused vector, and perform the detection based on the fused vector, wherein the two or more sensors are in a vehicle, and the processor is configured to detect a rumble strip traversed by the vehicle based on the fused vector.

7. The system according to claim 6, wherein the processor is further configured to normalize each of the two or more vectors associated with the two or more sensors prior to concatenating.

8. The system according to claim 6, wherein the processor is further configured to normalize the fused vector prior to performing the detection.

9. The system according to claim 6, wherein the processor is configured to perform the detection by implementing a machine learning algorithm.

10. The system according to claim 6, wherein the processor is configured to perform the detection by implementing a rule-based algorithm.

11. A lane departure system in a vehicle, comprising:
a camera configured to obtain images;
a microphone configured to obtain audio data; and
a processor configured to extract visual features from the images, extract audio features from the audio data, combine the visual features and the audio features into combined features in a fused vector, perform detection based on the combined features in the fused vector, and indicate lane departure based on the detection, wherein the detection detects a rumble strip indicating a shoulder area of a roadway.

12. The system according to claim 11, further comprising an inertial measurement unit (IMU) configured to obtain vibration data, wherein the combined features include features extracted from the vibration data.

13. The system according to claim 11, wherein the processor performs augmented or automated vehicle action based on the detection.

\* \* \* \* \*